March 10, 1953     H. A. BARNBY ET AL     2,630,952
CONTAINER CLOSING MACHINERY
Filed May 26, 1950     3 Sheets-Sheet 1
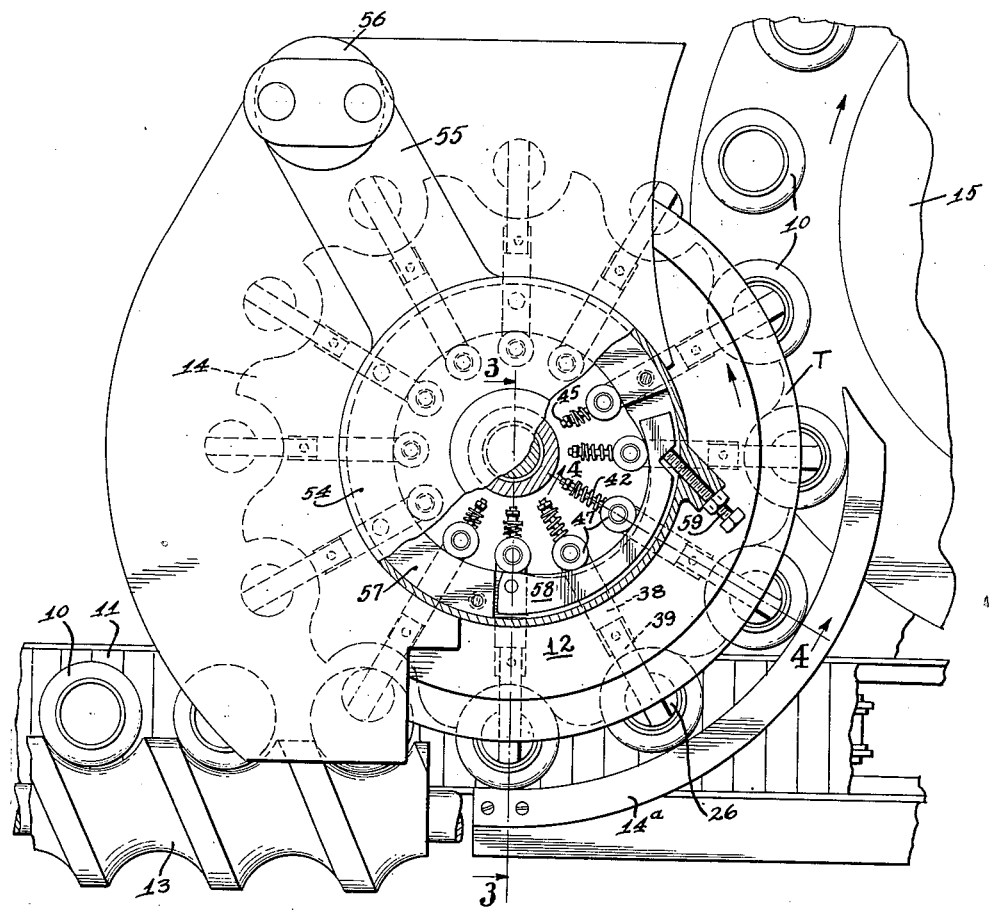
FIG-2-
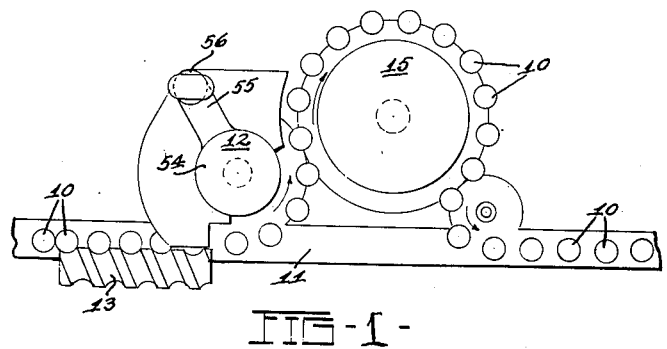
FIG-1-
Inventors
H. A. BARNBY
O. BUERING
By Rule & Hoge
Attorneys March 10, 1953 — H. A. BARNBY ET AL — 2,630,952
CONTAINER CLOSING MACHINERY
Filed May 26, 1950 — 3 Sheets-Sheet 2
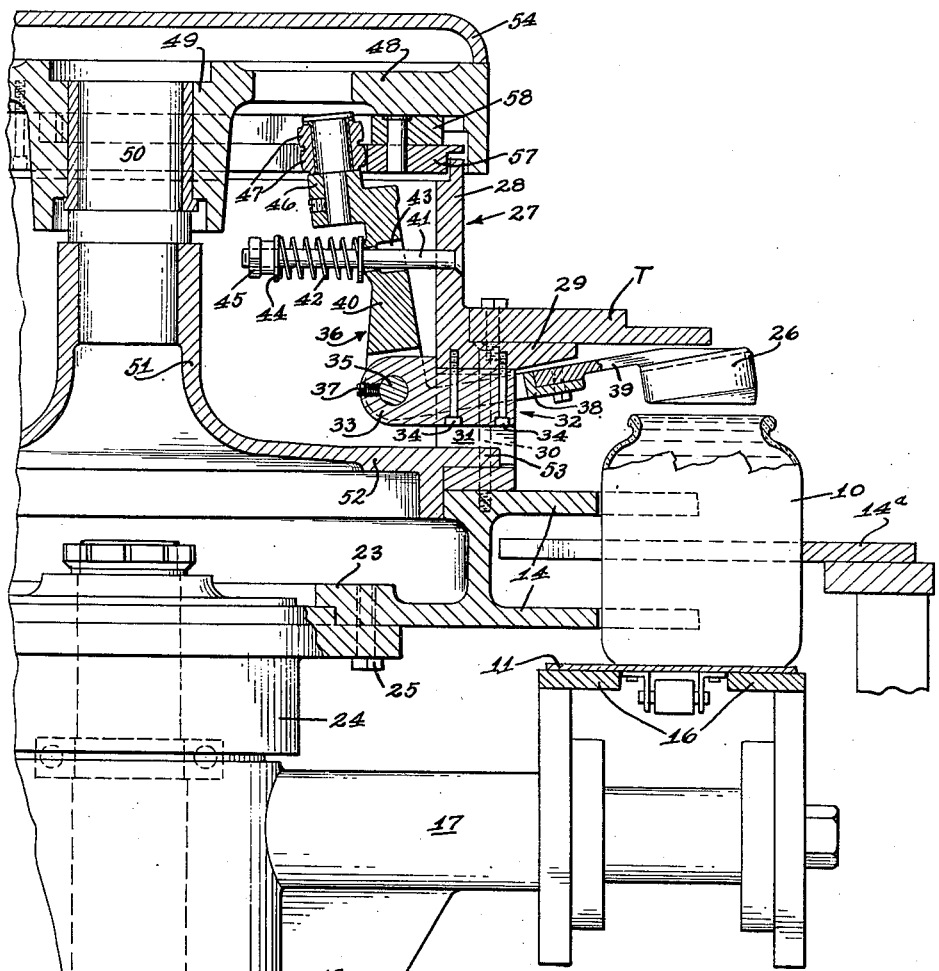
FIG-3-
Inventors
H. A. BARNBY
O. BJERING
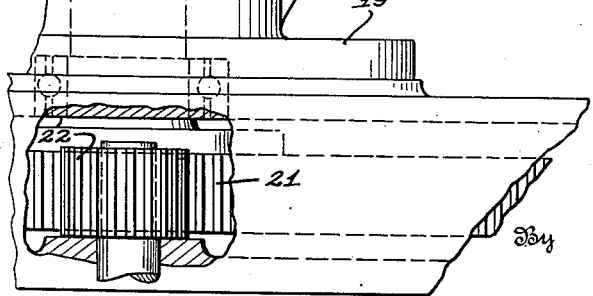
Attorneys

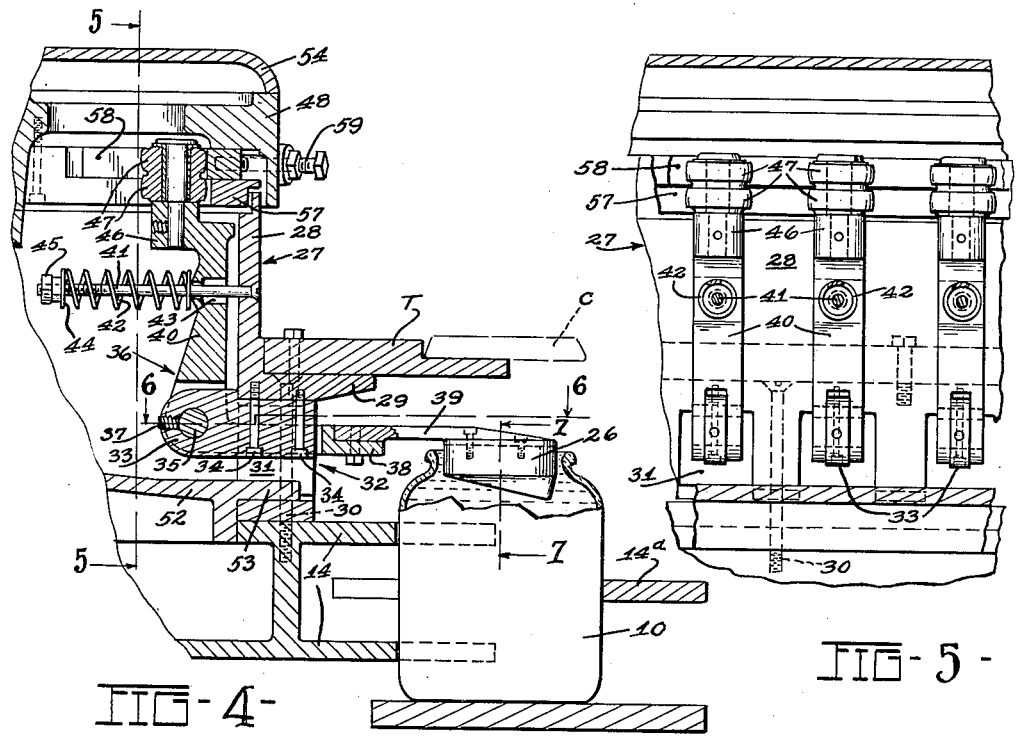
FIG-4-
FIG-5-
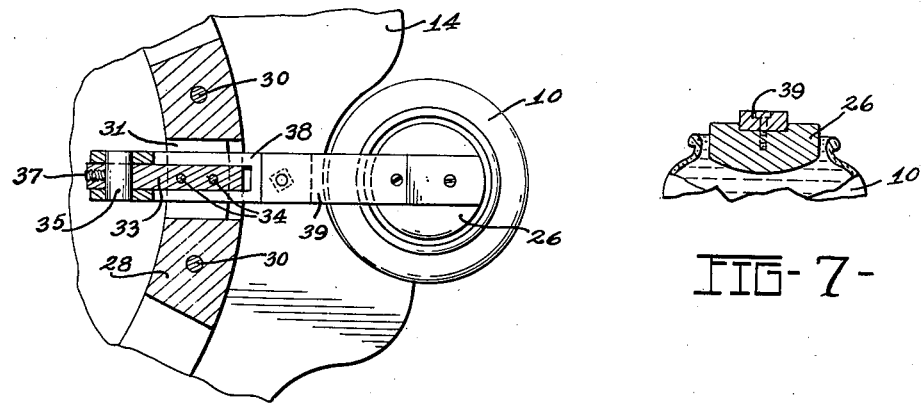
FIG-6-
FIG-7-

Patented Mar. 10, 1953

2,630,952

UNITED STATES PATENT OFFICE 2,630,952

CONTAINER CLOSING MACHINERY

Herbert A. Barnby and Olav Bjering, Toledo, Ohio, assignors to Owens-Illinois Glass Company, a corporation of Ohio Application May 26, 1950, Serial No. 164,516

18 Claims. (Cl. 226—22)

The present invention relates to improvements in container closing machinery and more particularly to apparatus for creating a suitable head space in filled containers prior to the sealing operation.

In the packaging of various foods in small containers, glass jars, for example, it is customary to vacuumize, or partially vacuumize, the filled containers and then seal same with suitable closures. One method of creating the vacuum or partial vacuum is to introduce steam into a space provided above the product being packed and immediately close the container. The entrapped steam condenses incident to cooling of the container and contents and thereby creates the necessary vacuum.

The primary object of the present invention is the provision of novel and effective means for regulably controlling the volume of the "head space" in the filled containers.

Another object is the provision of head spacing apparatus in which pads, or plungers, for creating the desired head space in the containers are arranged in an annular series and operable by readily adjustable means common to all of said pads.

It is also an object to provide a compact structure in which container spacing means, head spacers and closure carrying means are mounted for rotation about a common vertical axis.

Other objects will be in part apparent and in part pointed out hereinafter.

In the drawings:

Fig. 1 is a schematic plan view of a container closing line showing the position occupied by the head spacing apparatus;

Fig. 2 is a top plan view, partly in section, of the head spacing apparatus;

Fig. 3 is a vertical sectional elevational view of the head spacing apparatus taken substantially along the line 3—3 of Fig. 2;

Fig. 4 is a vertical sectional view taken substantially along the line 4—4 of Fig. 2;

Fig. 5 is a sectional elevational view taken substantially at the line 5—5 of Fig. 4;

Fig. 6 is a sectional plan view taken substantially along the line 6—6 of Fig. 4; and Fig. 7 is a fragmentary sectional view taken along the line 7—7 of Fig. 4.

Referring to Fig. 1, containers 10, glass jars for example, are carried on a horizontal line conveyor 11 to a head spacing apparatus 12. A timing screw 13 provides for proper delivery of the containers to the head spacing apparatus, the latter being associated with a star wheel 14 (Fig. 2) which properly positions said containers in the head spacing apparatus. From this apparatus the containers, with closures C positioned thereabove, move to a vapor sealing unit 15, or equivalent mechanism, from which they are removed and transferred to the conveyor 11, the latter carrying the sealed containers to a packing station.

The aforementioned conveyor 11 (Fig. 3) in proximity to the head spacing apparatus, rides upon guide rails 16 which are supported upon a bracket 17, the latter extending horizontally from a pedestal 18. This pedestal rises from a base 19 and houses a vertical shaft 20, the lower end of which carries a ring gear 21 running in mesh with a driving pinion 22. The star wheel 14 is connected to the upper end of the shaft by means of a web 23 and flanged hub 24, said web and hub being secured together by screws 25, or bolts. This star wheel is of conventional form and together with an arcuate guide rail 14a accurately positions the filled jars beneath the head spacing pads 26, or plungers. These pads, or plungers, are arranged in an annular series and are mounted upon a rotary carriage 27.

This rotary carriage 27 moves as a unit with the star wheel to which it is separably and rigidly connected and includes a cylindrical vertical wall 28 having a radial attaching flange 29. This flange carries a closure supporting table T and in turn rests upon the star wheel to which it is secured by screws 30. Below this flange 29, the vertical wall 28 is of greater thickness than above said flange and in this area is provided with an annular series of radial openings 31 corresponding in number to that of the pads, or plungers. In each of these openings a pad, or plunger carrier 32 is mounted.

Each pad, or plunger carrier unit comprises a bearing block 33 (Figs. 3–6) which is secured by screws 34 to the upper wall of the opening 31 and extends radially inward beyond said opening. A hinge pin 35 is mounted in the inner end of said bearing block and has its ends extended a short distance beyond each side of the latter to support a bell crank lever 36. A screw 37 secures the hinge pin in place. This bell crank lever includes an arm 38 which extends radially outward through said opening 31 and is slotted to straddle the bearing block. The inner end of this arm is rockably mounted upon the hinge pin 35. The outer end of this arm 38 is separably connected to a finger 39 to which the pad 26 is secured. Such separable connection facilitates interchanging the pads as operating conditions and the size of the containers may require. The other arm 40 of the bell crank lever extends upwardly in proximity to the inner side of the cylindrical wall 28. Spring means consisting of a guide pin 41 and coil spring 42, tends to move the lever into position, such that the pad projects downwardly as indicated in Fig. 4. The guide pin 41 is anchored in the vertical wall 28, and extends radially inward through an opening 43 in said arm 40 and at its inner end carries a washer 44 and nut 45, the latter element being adjustable to regulate the tension of the coil spring 42. The upper end 46 of the arm 40 of this bell crank lever is offset and carries a pair of superposed cam rollers 47 which run upon cams shaped to move the bell crank lever as required.

These cams are stationary and are supported by a carrier 48 or spider, which includes a center vertical bearing 49 for a stub shaft 50, the latter carried by a support 51. This support 51 includes a peripheral flange 52 which is provided with an annular series of radial fingers 53 extending into the openings 31 of said vertical wall 28. The spider and a cover 54 therefore, are connected by means of a horizontal arm 55 (Figs. 1 and 2) to a post 56 and thereby further supported and held against undesired movement.

One cam 57 (Figs. 2 and 3) is continuous and throughout a major part of its length is shaped to hold the bell crank levers so that the pads occupy their elevated positions. This cam engages the lower cam rollers. An adjustable cam 58 is mounted in a cut-out portion of the first named cam 57 and is pivoted at one end to the latter. The free end of the pivoted cam is engaged by an adjusting screw 59 which is mounted in the spider. By manipulation of this screw the pivoted, or adjustable cam may be located to permit any desired degree of lowering of the pads. This varies in accordance with the head space, or fill point desired.

Briefly, the operation involves feeding filled containers to the head spacing apparatus, lowering the pads into these containers to remove excess material, elevating these pads to the position shown in Fig. 3, and then passing the containers through the vapor sealing unit 15.

Modifications may be resorted to within the spirit and scope of the appended claims.

We claim:

1. In combination, means for moving open, filled containers along a horizontal path, a series of head spacers movable in a closed horizontal path at least in part overlying the path of said containers, bell crank levers individual to and directly supporting said head spacers, spring means for moving said levers to thereby lower the head spacers into said containers and an adjustable cam for moving the levers in opposition to the spring means to thereby elevate said head spacers and regulably predetermining the lowermost position of the head spacers.

2. In combination, means for moving open, filled containers along a horizontal path, a series of head spacers movable in a closed horizontal path at least in part overlying the path of said containers, bell crank levers individual to and directly supporting said head spacers, spring means for moving said levers to thereby lower the head spacers into said containers in one section of their path of travel, an adjustable cam for predetermining the lowermost position of the head spacers and elevating same, and means separate from said adjustable cam for holding the head spacers elevated in another section of their path of travel.

3. In combination, means for moving open, filled containers along a horizontal path, a series of head spacers movable in a closed path at least in part overlying the path of said containers, bell crank levers individual to the head spacers, one arm of each lever directly supporting a head spacer, spring means connected to the other arm of each bell crank lever and operable to move said lever and thereby lower the corresponding head spacer into a container, a cam arranged to move the lever in opposition to the spring means and thereby elevate said head spacers, a cam roll on each bell crank lever adapted for engagement with said cam, and means for regulably controlling the extent of movement of said levers whereby to predetermine the lowermost position of the head spacers.

4. In combination, means for moving open, filled containers along a horizontal path, a series of head spacers movable in a closed path at least in part overlying the path of said containers, bell crank levers individual to the head spacers, one arm of each lever directly supporting a head spacer, spring means connected to the other arm of each bell crank lever and operable to lower the head spacers into containers, a cam arranged to move the levers in opposition to the spring means and thereby elevate said head spacers, a cam roll on each bell crank lever adapted for engagement with said cam, and means for adjusting the cam to predetermine the lowermost position of the head spacers.

5. In combination means for moving open, filled containers along a horizontal arcuate path, means for effecting uniform spacing of the containers along said path, a vertical supporting column about which said container spacing means may be rotated, a housing above said spacing means including a radially slotted lower circular wall mounted for movement with said spacing means, a stationary cover thereabove, bell crank levers mounted in the radial slots of said movable wall, a head spacer supported upon each bell crank lever, spring means within the movable part of the housing and individual to the bell crank levers for moving the latter and thereby lowering said head spacers into the containers, rollers on said bell crank levers, and cam means within said housing for engaging said rollers and moving the bell crank levers to thereby elevate the head spacers.

6. In combination means for moving open, filled containers along a horizontal arcuate path, means for effecting uniform spacing of the containers along said path, a vertical supporting column about which said container spacing means may be rotated, a housing above said spacing means including a radially slotted lower circular wall mounted for movement with said spacing means, a stationary cover thereabove, bell crank levers mounted in the radial slots of said movable wall, a head spacer supported upon each bell crank lever, spring means within the movable part of the housing and individual to the bell crank levers for moving the latter and thereby lowering said head spacers into the containers, rollers on said bell crank levers, and a radially adjustable cam mounted on said cover operable to regulably control the extent of downward movement of said head spacers.

7. In combination, means for moving filled containers along a horizontal path, a series of head spacers movable in a closed path at least in part overlying the path of said containers, means for lowering said head spacers into and removing them from the containers, and means immediately above the head spacers for supporting closures in vertical alignment with said containers during said head spacing operations.

8. In combination, means for moving filled containers along a horizontal path, a series of head spacers movable in a closed path at least in part overlying the path of said containers, means for lowering said head spacers into and removing them from the containers, and a horizontal shelf immediately above the head spacers, said shelf providing a support for closures traveling in vertical alignment with the containers, said shelf also providing a partial cover for said head spacers.

9. In combination, a spider mounted for rotation about a vertical axis, an annular series of container spacing devices at the periphery of said spider, an annular upstanding wall arranged upon said spider radially inward from the spacing means, said wall having an annular series of radial slots, a horizontal bearing provided at each slot, a bell crank lever rockably mounted upon each bearing with one arm extending radially outward through the corresponding slot and another arm directed upwardly within said wall, spring means normally urging the upwardly directed arm toward said wall, a cam common to said spacing devices and positioned adjacent the interior of said wall for engagement with the upwardly directed arm and operable to move the latter in opposition to the spring means, and a head spacing device carried by the other arm externally of said wall.

10. In combination, a spider mounted for rotation about a vertical axis, an annular series of container spacing devices at the periphery of said spider, an annular upstanding wall arranged upon said spider radially inward from the spacing means, said wall having an annular series of radial slots, a horizontal bearing provided at each slot, a bell crank lever rockably mounted upon each bearing with one arm extending radially outward through the corresponding slot and another arm directed upwardly within said wall, spring means normally urging the upwardly directed arm toward said wall, and means comprising a movable cam section positioned between said wall and said upwardly extending arm and operable on the latter for predetermining the extent to which the bell crank levers may be moved in one direction about the bearings.

11. In combination, a spider mounted for rotation about a vertical axis, an annular series of container spacing devices at the periphery of said spider, an annular upstanding wall arranged upon said spider radially inward from the spacing means, said wall having an annular series of radial slots, a horizontal bearing provided at each slot, a bell crank lever rockably mounted upon each bearing with one arm extending radially outward through the corresponding slot and another arm directed upwardly within said wall, spring means normally urging the upwardly directed arm toward said wall, a stationary cover overlying the spider and said annular wall, an adjustable cam fixed to the interior of said cover for engagement with the upwardly directed arm and operable to move the latter in opposition to the spring means and for varying the extent of downward movement of the head spacing device.

12. In combination, a star wheel mounted for rotation about a vertical axis and operable to uniformly space filled containers along a horizontal path, head spacing means comprising an annular series of vertically movable pads arranged above said star wheel for movement with the latter about said axis and closure supporting means positioned at a level above the head spacing means and rotatable with the latter about said axis, said closure supporting means arranged to releasably support closures above and in substantial vertical alignment with the pads and containers.

13. In combination, means for moving containers along a horizontal path, a series of head spacers movable in a closed path at least in part overlying the path of said containers, means for lowering said head spacers into and removing them from the containers, and closure supporting means positioned at a level above the head spacers, said closure supporting means arranged to releasably support closures above and in substantially vertical alignment with the head spacers and containers.

14. In combination, a star wheel mounted for rotation about a vertical axis and operable to uniformly space filled containers along a horizontal path, head spacing means comprising an annular series of vertically movable pads arranged above said star wheel for movement with the latter about said axis, and a horizontal shelf positioned above said pads, said shelf providing a support for closures traveling in vertical alignment with the containers, said shelf also providing a partial cover for said head spacers.

15. In combination, means for moving open, filled containers along a horizontal path, a series of head spacers movable in a closed path at least in part overlying the path of said containers, bell crank levers individual to and directly supporting said head spacers, spring means for moving said levers to thereby lower the head spacers into said containers, adjustable cam means for regulably controlling the extent to which said head spacers may be lowered and for elevating the head spacers, and closure supporting means positioned at a level above the head spacers, said closure supporting means arranged to releasably support closures above and in substantially vertical alignment with the head spacers and containers.

16. In combination, means for moving open, filled containers along a horizontal path, a series of head spacers movable in a closed path at least in part overlying the path of said containers, bell crank levers individual to the head spacers, one arm of each lever directly supporting a head spacer, spring means connected to the other arm of each bell crank lever and operable to move said lever and thereby lower the corresponding head spacer into a container, a cam arranged to move the lever in opposition to the spring means and thereby elevate said head spacers, a cam roll on each bell crank lever adapted for engagement with said cam, means for regulably controlling the extent of movement of said levers whereby to predetermine the lowermost position of the head spacers, and closure supporting means positioned at a level above the head spacers, said closure supporting means arranged to releasably support closures above and in substantially vertical alignment with the head spacers and containers.

17. In combination, means for moving open, filled containers along a horizontal arcuate path, means for effecting uniform spacing of the containers along said path, a vertical supporting column about which said container spacing means may be rotated, a housing above said spacing means including a radially slotted lower circular wall mounted for movement with said spacing means, a stationary cover thereabove, bell crank levers mounted in the radial slots of said movable wall, a head spacer supported upon each bell crank lever, spring means within the movable part of the housing and individual to the bell crank levers for moving the latter and thereby lowering said head spacers into the containers, rollers on said bell crank levers, cam means within said housing for engaging said rollers and moving the bell crank levers to thereby elevate the head spacers, and closure supporting means mounted on said housing positioned at a level above the head spacing means, said closure supporting means arranged to releasably support closures above and in substantially vertical alignment with the head spacers and containers.

18. In combination, means for moving open, filled containers along a horizontal arcuate path, means for effecting uniform spacing of the containers along said path, a vertical supporting column about which said container spacing means may be rotated, a housing above said spacing means including a radially slotted lower circular wall mounted for movement with said spacing means, a stationary cover thereabove, bell crank levers mounted in the radial slots of said movable wall, a head spacer supported upon each bell crank lever, spring means within the movable part of the housing and individual to the bell crank levers for moving the latter and thereby lowering said head spacers into the containers, rollers on said bell crank levers, a radially adjustable cam mounted on said cover operable to regulably control the extent of downward movement of said head spacers, and closure supporting means mounted on said housing positioned at a level above the head spacing means, said closure supporting means arranged to releasably support closures above and in substantially vertical alignment with the head spacers and containers.

HERBERT A. BARNBY.
OLAV BJERING.

REFERENCES CITED

The following references are of record in the file of this patent:

UNITED STATES PATENTS

| Number | Name | Date |
|---|---|---|
| 1,320,749 | Fleischer | Nov. 4, 1919 |
| 1,884,666 | Guenther | Oct. 25, 1932 |
| 1,965,246 | Meyer | July 3, 1934 |
| 2,137,389 | Chapman | Nov. 22, 1938 |
| 2,267,744 | Nordquist | Dec. 30, 1941 |
| 2,510,568 | Fouse | June 6, 1950 |